(12) United States Patent
Fukasawa

(10) Patent No.: US 6,243,174 B1
(45) Date of Patent: Jun. 5, 2001

(54) IMAGE PROCESSING DEVICE, COLOR PRINTING DEVICE, IMAGE PROCESSING METHOD AND MEDIUM RECORDING IMAGE PROCESSING PROGRAM

(75) Inventor: Kenji Fukasawa, Nagano (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 08/955,177

(22) Filed: Oct. 21, 1997

(30) Foreign Application Priority Data

Oct. 24, 1996 (JP) .................................................. 8-282727

(51) Int. Cl.[7] ........................................................ H04N 1/46
(52) U.S. Cl. ............................ 358/530; 358/518; 358/448
(58) Field of Search ................................... 358/448, 451, 358/452, 455, 468, 518, 530, 537, 523, 1.15, 1.9, 1.2; 382/298, 299, 162, 167; 395/102, 109, 114; 345/132; 347/211

(56) References Cited

U.S. PATENT DOCUMENTS

| | | | | |
|---|---|---|---|---|
| 5,270,836 | * | 12/1993 | Kang ..................................... | 358/459 |
| 5,291,220 | * | 3/1994 | Klees ..................................... | 347/172 |
| 5,436,734 | * | 7/1995 | Yamauchi et al. .................... | 358/448 |
| 5,552,894 | * | 9/1996 | Aiba ..................................... | 358/298 |
| 5,657,430 | * | 8/1997 | Smith et al. .......................... | 395/102 |
| 5,664,070 | * | 9/1997 | Egawa et al. ........................ | 358/1.2 |
| 5,704,020 | * | 12/1997 | Hanyu et al. ........................ | 358/1.2 |
| 5,778,158 | * | 7/1998 | Fujii et al. ........................... | 395/102 |
| 5,875,044 | * | 2/1999 | Seto et al. ........................... | 358/518 |
| 5,905,490 | * | 5/1999 | Shu et al. ............................. | 345/199 |

* cited by examiner

*Primary Examiner*—Edward Coles
*Assistant Examiner*—Joseph R. Pokrzywa
(74) *Attorney, Agent, or Firm*—Sughrue, Mion, Zinn, Macpeak & Seas, PLLC

(57) ABSTRACT

In order to prevent an operational amount of color conversion from increasing when resolution is changed since the operational amount of color conversion is increased when the conversion is performed such that resolution is enhanced in printing, resolution of color image data constituting pre conversion data is compared with resolution of color image data constituting post conversion data. As a result of comparison, when the resolution on the input side is lower, color conversion is previously performed and resolution is converted subsequently, when the resolution on the input side is higher, resolution is converted prior to color conversion. Thus where conversion of resolution and color conversion are executed, color conversion is performed on the side having a lower one of the resolutions whereby color conversion is performed in respect of fewer pixels and the processing can be optimized.

14 Claims, 5 Drawing Sheets

IMAGE PROCESSING DEVICE, COLOR PRINTING DEVICE, IMAGE PROCESSING METHOD AND MEDIUM RECORDING IMAGE PROCESSING PROGRAM

BACKGROUND OF THE INVENTION

1. Field of the Invention

The present invention relates to an image processing device, a color printing device, an image processing method and a medium recording an image processing program accompanied by conversion of resolution and color conversion.

2. Description of the Prior Art

In printing a color image from an application in a computer system, conversion of resolution must be performed due to a difference in a resolution on a screen and a resolution in a printing device and data of RGB (red, green, blue) handled in a computer system is to be converted into data of CMY (cyan magenta, yellow) corresponding to ink colors of a printer.

In this case, the conversion of resolution is not indispensable since there are cases where both resolutions coincide with each other or where coincidence of the resolutions does not pose a problem. Therefore, as a procedure of processings, color conversion is executed after having resolutions coincide with each other.

According to the above-described conventional image processing device, when conversion is performed such that resolution is promoted, an original single pixel is converted into a plurality of pixels by which an operational amount of color conversion is increased since color conversion is carried out with respect to each pixel.

SUMMARY OF THE INVENTION

Therefore, it is an object of the present invention to provide an image processing device, a color printing device, an image processing method and a medium recording an image processing program capable of optimizing processings when conversion of resolution and color conversion are executed.

According to an image processing device accompanied by conversion of resolution and color conversion of the present invention, color conversion is performed in a state of low resolution, more specifically, the device includes resolution comparing means for comparing a resolution of color image data constituting pre conversion data with a resolution of color image data constituting post conversion data, resolution converting means for converting the resolutions between the color image data constituting the pre conversion data and the color image data constituting the post conversion data, color converting means for performing a color conversion between a color representing space of the color image data constituting the pre conversion data and a color representing space of the color image data constituting the post conversion data, and conversion order controlling means for executing the color conversion before or after converting the resolution on a side having a lower one of the resolutions, based on a comparison result of the resolution comparing means.

According to the present invention constituted as described-above, when the resolution converting means converts the resolutions between the color image data constituting the pre conversion data and the color image data constituting the post conversion data, the resolution comparing means compares the resolution of the color image data constituting the pre conversion data with the resolution of the color image data constituting the post conversion data and the color conversion is performed between the color representing space of the color image data constituting the pre conversion data and the color representing space of the color image data constituting the post conversion data on the side having a lower one of the resolutions before or after converting the resolutions under control of the conversion order controlling means. Needless to say, various methods can be substituted for the conversion order controlling means.

The essence of the present invention resides in performing color conversion in a state of low resolution when conversion of resolution and color conversion are executed in which when the original resolution is low and a conversion of enhancing the resolution is performed, the color conversion is performed before converting the resolution and when the original resolution is high and a conversion of lowering the resolution is performed, the color conversion is performed after converting the resolution.

Accordingly, the color conversion is performed in a state where pixels constituting the object of color conversion are few and accordingly the amount of processings can be reduced.

The resolution comparing means compares the resolution of the color image data constituting the pre conversion data with the resolution of the color image data constituting the post conversion data, where the means is not necessarily limited to a means for automatically outputting the comparison result and may be a means capable of determining on which side the resolution is low or high as a result, accordingly, the means may be a changeover switch by manual operation.

Various methods can be adopted with regard to methods of the resolution converting means for converting the resolutions between the color image data constituting the pre conversion data and the color image data constituting the post conversion data. Further, the resolution in this case corresponds to a number of pixels of rasterized dot matrix data in which before rasterizing as in meta file, in a state of a command file having no pixels, a number of objects to be subjected to color conversion corresponds to a number of commands designating color. Therefore, in this case, in a broad sense, the side having a lower one of the resolutions designates color image data where colors are designated by commands before rasterizing.

The color converting means performs color conversion between the color representing space of the color image data constituting the pre conversion data and the color representing space of the color image data constituting the post conversion data and various kinds of converting methods can be adopted. Generally, a color conversion table having component values of image data in a pre conversion color representing space is prepared and the color conversion table is referred. Naturally, in referring to the color conversion table, the operation can pertinently be changed as in utilizing interpolation calculation, utilizing a grey scale conversion in place of an interpolation calculation disclosed in Japanese Unexamined Patent Publication No. JP-A-7-30772 filed by the applicants or the like.

The conversion order controlling means may execute color conversion from the side having a lower one of the resolutions before or after converting the resolution degree as a result in which, for example, a procedure of converting the resolution after previously performing color conversion and a procedure of performing color conversion after previously converting the resolution may be prepared and either one of the procedures may be selected.

Various kinds of devices may be conceived as application examples where conversion of resolution and color conversion are executed. Therefore, it is an object of the present invention to provide a color printing device that is one application example.

According to an aspect of the present invention, there is provided a color printing device for printing a color image in accordance with a predetermined record density, in which raster data in accordance with the record density is formed from color image data constituting pre conversion data and color conversion is performed from a color representing space of the color image data constituting the pre conversion data to a color representing space of a print ink for printing with the record density, wherein a resolution of the color image data constituting the pre conversion data is compared with a resolution at the record density and the color conversion is performed before or after converting the resolutions, on a side having a lower one of the resolutions.

According to the color printing device printing dots at the predetermined record density, the raster data in accordance with the record density is formed from the color image data constituting the pre conversion data and the color conversion is performed from the color representing space of the color image data constituting the pre conversion data to the color representing space of the print ink printing at the record density.

According to the present invention constituted as described-above, the resolution of the color image data constituting the pre conversion data is compared with the resolution at the record density and the color conversion is performed before and after converting the resolutions, on the side having a lower one of the resolutions.

Therefore, according to the present invention, the processing can be optimized in the color printing device for printing color image by printing dots at the predetermined record density.

More specifically, the present invention can be realized by a constitution in which in a computer adopting an operating system, the operating system controls data in correspondence with a pixel size designated by the application and data in correspondence with a pixel size of a printing device, a printer driver compares resolution of color image data constituting pre conversion data with resolution of color image data constituting post conversion data based on the information and the color conversion is performed on the side having a lower one of the resolutions based on the comparison result.

Further, the present invention is not limited to such an output stage but is applicable also to an input stage. For example, even in the case where an image processing application reads image data via a peripheral equipment, there is a case where color conversion of converting color tone of a input device to that in a standard system, and conversion of resolution in accordance with a size of an image file to be handled, are executed. At this stage, the color conversion may be executed on the side having a lower one of the resolutions. That is, when the application reads color image data constituting pre conversion data, the color conversion is performed in a state having a lower one of the resolutions in comparison with color image data held inside. Further, even in the case where the color image data is transmitted via a communication network and is displayed on a display, the similar operation is performed and the present invention is naturally applicable to a color facsimile, a color copier, a color scanner, a digital still camera, a digital video camera and the like.

Naturally, examples of implementing the thought of the present invention are not limited to those described above but according to an aspect of the present invention, there is provided a method of image processing accompanied by conversion of resolution and color conversion, the method including, a step of comparing a resolution degree of color image data constituting pre conversion data with a resolution of color image data constituting post conversion data, a step of converting the resolutions between the color image data constituting the pre conversion data and the color image data constituting the post conversion data, a step of performing a color conversion between a color representing space of the color image data constituting the pre conversion data and a color representing space of the color image data constituting the post conversion data and a step of controlling a conversion order such that the color conversion is executed before or after converting the resolutions, on a side having a lower one of the resolutions, based on a comparison result of the resolutions.

That is, the present invention is not necessarily limited to a substantial device but is effective also as a method thereof.

In the meantime, when an example of implementing the thought of the invention is a software of an image processing control program, the present invention is naturally present and utilized also on a record medium recording such a software. Of course, the record medium may be a magnetic record medium or a photomagnetic record medium and any record medium to be developed in the future can be regarded quite similarly. Further, the same goes with unquestionably in respect of a copying stage of a firstly copied product, a secondly copied product and the like. In addition thereto, in respect of a software, the present invention is invariably utilized even in the case where the method of supplying the software is not provided by the above-described record media but is provided by utilizing a communication network. In that case, the side of providing software by utilizing a communication network functions as a device of providing the software and utilizes the present invention similarly and invariably.

Further, the thought of the present invention remains unchanged even in the case where a portion is constituted by a software and other portion is realized by a hardware and the present invention may be of a mode where a portion thereof is stored in a record medium and is pertinently read as necessary.

BRIEF DESCRIPTION OF THE DRAWINGS

FIG. 2(*b*) is a block diagram showing the constituents of a printer driver;

DESCRIPTION OF THE PREFERRED EMBODIMENTS

An explanation will be given of embodiments of the present invention in reference to the drawings as follows.

Figure 1:
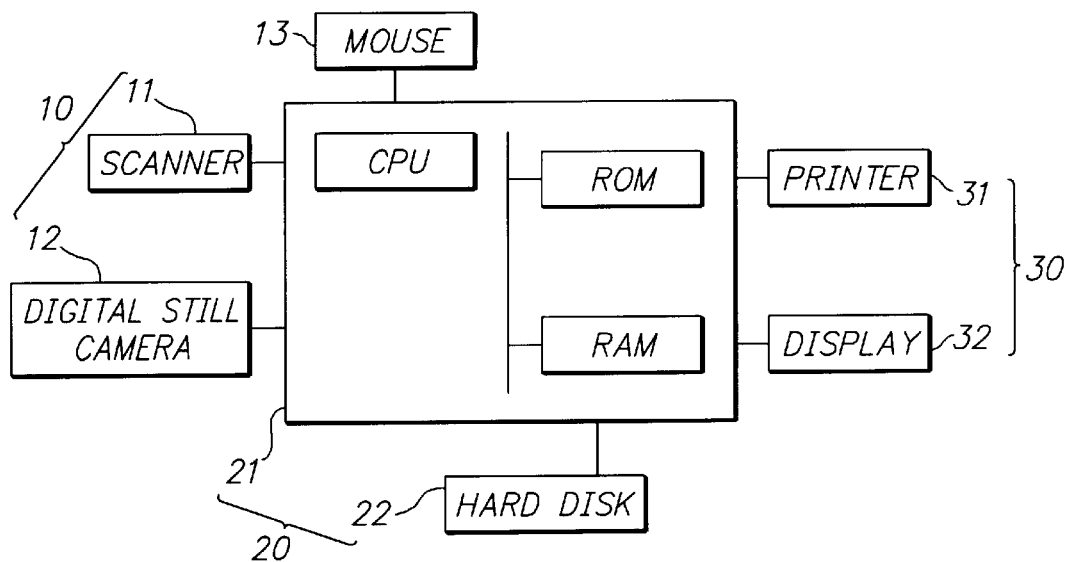
FIG. 1 is a block diagram of an example of a specific hardware constitution of a color conversion device according to an embodiment of the present invention.

FIG. 1 shows by a block diagram an example of a specific hardware constitution of a color conversion device according to one embodiment of the present invention.

In FIG. 1, an image input device 10 outputs grey scale color representing data to an image processing device 20 by photographing a color image or the like, the image processing device 20 performs a predetermined image processing including conversion of resolution and color conversion in respect of the data and outputs the data to the image output device 30 and the image output device 30 displays an original color image.

Figure 2A:
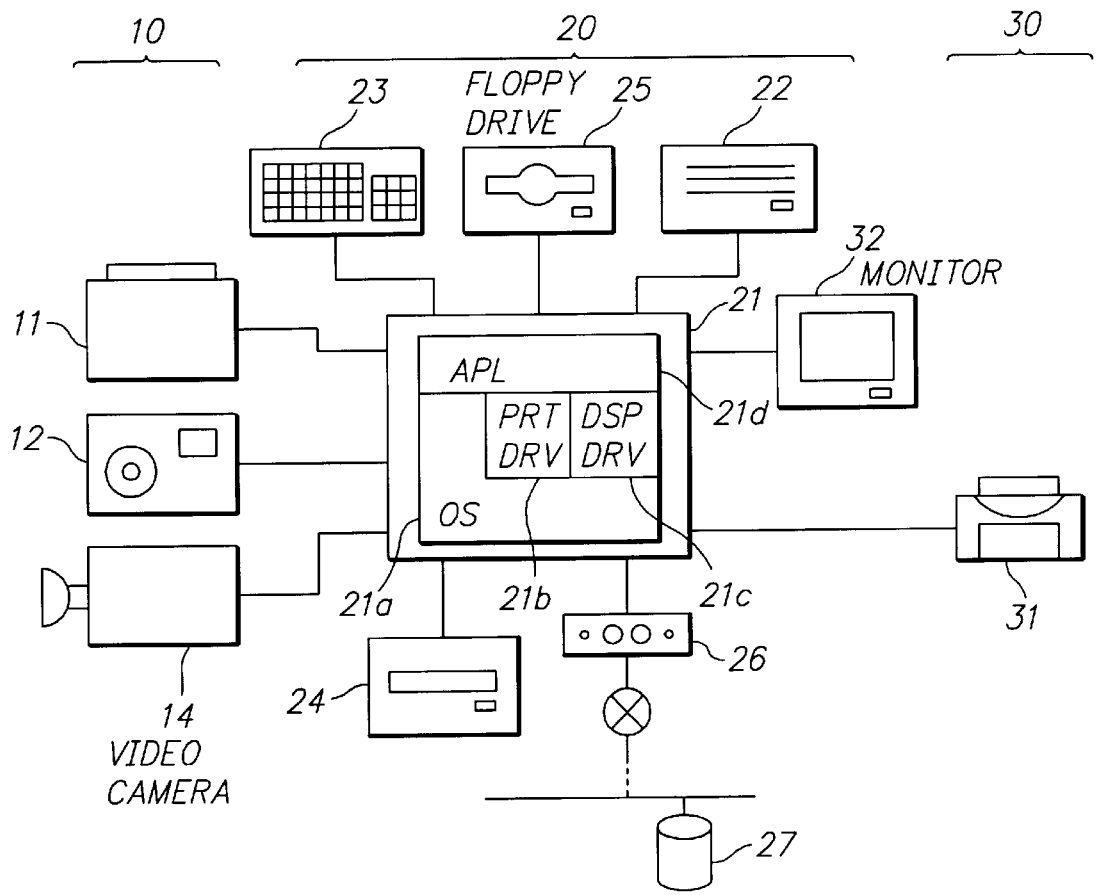
FIG. 2(*a*) is a block diagram showing processings performed inside of a computer.
Figure 2B:
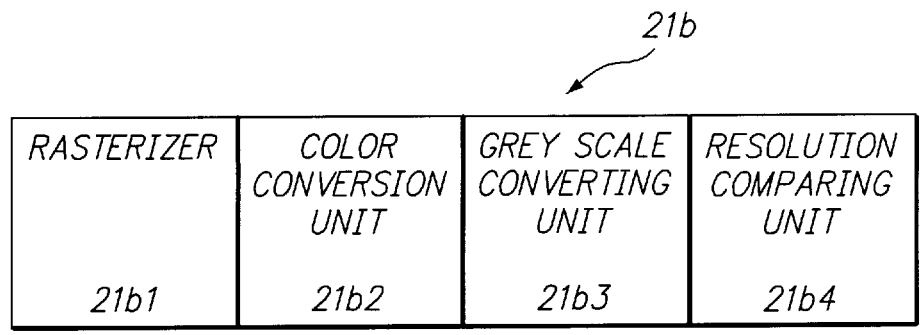

In this case, a scanner 11, a digital still camera 12, a video camera 14, or the like correspond to a specific example of the image input device 10; a computer 21, a hard disc 22 and a computer system comprising a key board 23, a CD-ROM drive 24, a floppy disc 25, a modem 26 and the like correspond to a specific example of the image processing device 20, as can be seen in FIG. 2(a), and a printer 31, a display 32 or the like corresponds to a specific example of the image output device 30, also seen in FIG. 2(a). Incidentally, the modem 26 is connected to a public communication network, connected to an outside network via the public communication network and can introduce by downloading software or data from a file server 27. Accordingly, not only the floppy disc or the CD-ROM or the like constitutes a record medium but a communication network is naturally included in a record medium.

When the scanner 11 as image input device 10 outputs grey scale data of, for example, RGB (red, green, blue) as grey scale color representing data and further, the printer 31 as the image output device 30 necessitates as an input data binary data of CMY (cyan, magenta, yellow) or CMYK added with black as grey scale color representing data, a specific role of the computer main body 21 as the image processing device 20 is to convert grey scale data of RGB into binary data of CMY. Further, referring to both FIG. 1 and FIG. 2(a), when an image of a bit map system is drawn by using the key board 23, a mouse 13 or the like, the image is processed as grey scale data of RGB, in the case of the display 32, data is displayed by using it as it is and in the case of the printer 31, a processing of converting the data into binary data of CMY is similarly carried out. Incidentally, a similar operation is performed also in the case where an image of a draw system is drawn.

FIG. 2(a) shows processings carried out inside of the computer main body 21. As shown by FIG. 2(a), in the computer main body 21, an operating system 21a is operated and a printer driver 21b and a video driver 21c corresponding to the printer 31 and the display 32 are integrated. Meanwhile, execution of processings of an application 21d is controlled by the operating system 21a and the application 21d carries out a predetermined image processing in cooperation with the printer driver 21b and the video driver 21c as necessary.

In the case of the scanner 11, read heads are formed at predetermined intervals and read resolution is determined in correspondence with the interval between the read heads. Meanwhile, in respect of the application 21d, although it is generally, known to hold data by having the resolution of the data coincide with display resolution of the display 32, a processing where the resolution of the data is always made to coincide with the resolution of the display 32 may be performed while holding the data virtually.

Print data formed by the application 21d is inputted to the printer driver 21b via the operating system 21a and the printer driver 21b converts the print data into image data of a format requested by the printer 31. The conversion corresponds to the above-described processing of converting grey scale data of RGB into binary data of CMY. Further, the video driver 21c writes display image data formed by the application 21d to a predetermined memory for screen and displays at the display 32 via a hardware circuit.

Figure 3:
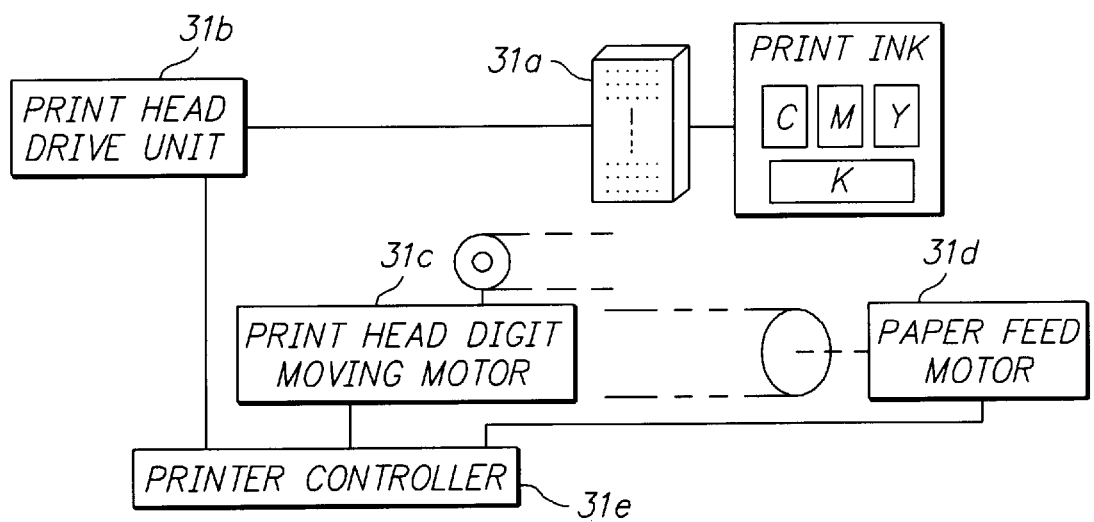
FIG. 3 is a view showing an outline constitution of a printer.

The image data formed by the printer driver 21b is a dot matrix data comprising binary data of CMY and the data is transmitted to the printer 31. FIG. 3 shows the outline constitution of the printer 31 and the printer 31 includes as major constituent parts, print heads 31a formed with ink inject holes of respective colors in the vertical direction, a print head drive unit 31b for driving to inject color printing ink from predetermined ones of the ink inject holes in the print heads 31a, a print head digit moving motor 31c for reciprocating the print heads 31a in the digit direction, a paper feed motor 31d, print buffers in addition thereto and the like and is provided with a printer controller 31e performing a general control. That is, the dot matrix data correspond to an arrangement of the ink inject holes in the print heads 31a as well as correspond to the scanning range of the print heads 31a in the digit moving direction and when the print heads 31a is moved in the digit direction by the print head digit moving motor 31c, the print head drive unit 31b has the color printer ink injected from the predetermined ones of the ink inject holes in correspondence with the dot matrix data by which printing is performed.

In this case, the ink inject holes of print heads 31a do not constitute immediately a pixel size but a distance between centers of actually printed dots is calculated as a pixel size in view of a control operation by the paper feed motor 31d and the print head digit moving motor 31c while using such ink inject holes.

Figure 4:
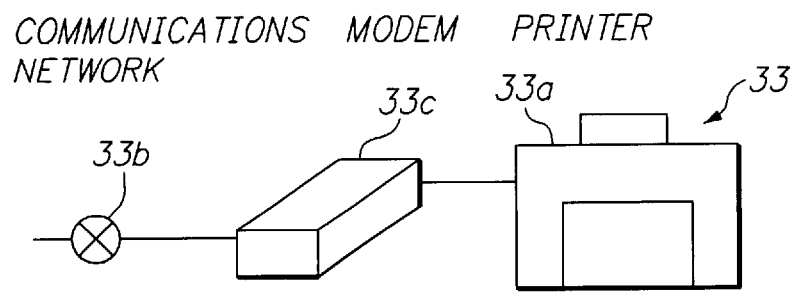
FIG. 4 is a block diagram of a printer system according to other application example of the present invention.
Figure 5:
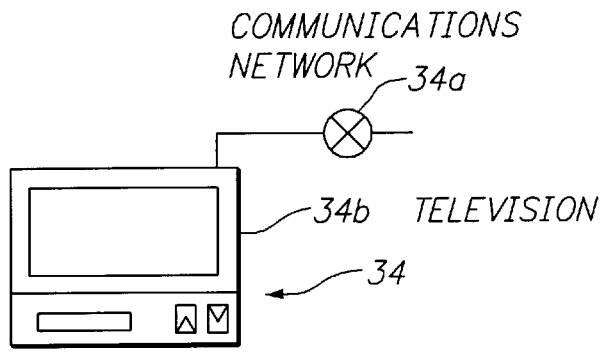
FIG. 5 is a block diagram of a printer system according to other application example of the present invention.

Although according to the embodiment, as an application example of the color conversion device, the above-described printing system combined with the computer and the printer is pointed out, a system performing conversion of resolution and color conversion in respect of input data is sufficiently applicable. For example, as shown by FIG. 4, the system may be a printer system 33 including a printer 33a connected via a modem 33c to a communication network 33b such as a telephone network or the like for printing image data by receiving it or the like. Alternatively, the system may be a television system 34 including television 34b capable of receiving general image broadcast by being connected to a communications network 34a, which prints a color image supplied from the network as shown by FIG. 5. Further, the system is applicable to various ranges of devices such as a color copier or a color facsimile.

Figure 6:
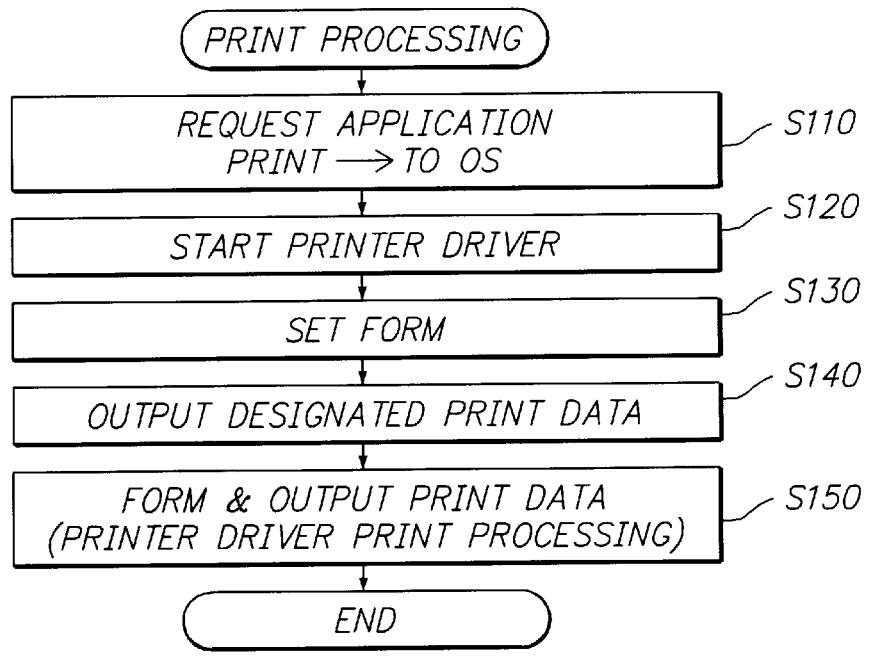
FIG. 6 is a flow chart showing a procedure of printing processings of an application.
Figure 7:
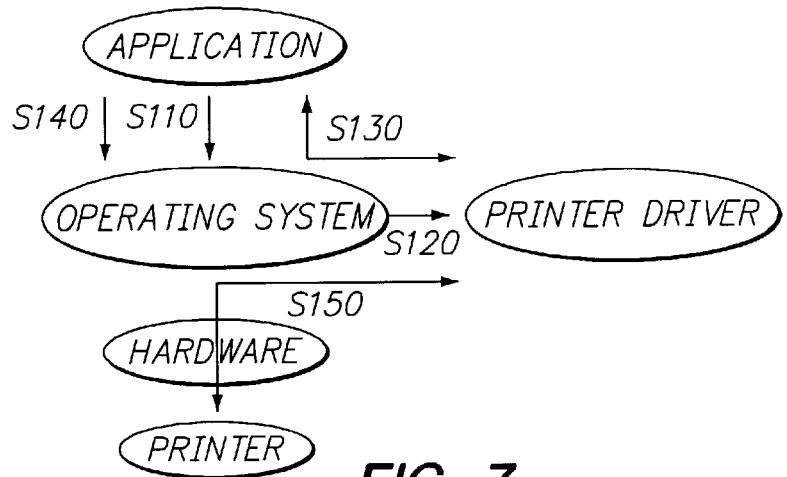
FIG. 7 is a view corresponding to a system showing the procedure of printing processings of an application.

Next, an explanation will be given of the print processing that is performed from the computer 21 to the printer 31. FIG. 6 and FIG. 7 show a procedure in the case where the application 21d performs printing. The application 21d executes the print processing while mutually cooperating with the operating system 21a and the printer driver 21b. That is, when the application 21d requests printing to the operating system 21a at step S110, the operating system 21a starts the printer driver 21b at step S120 and the application 21d and the printer driver 21b cooperate to execute setting of a form or the like at step S130. Thereafter, the application 21d outputs print data to the operating system 21a in a predetermined format in correspondence with the form at step S140 and accordingly, the printer driver 21b forms the data by receiving the output of the print data and outputs it at step S150.

Figure 8:
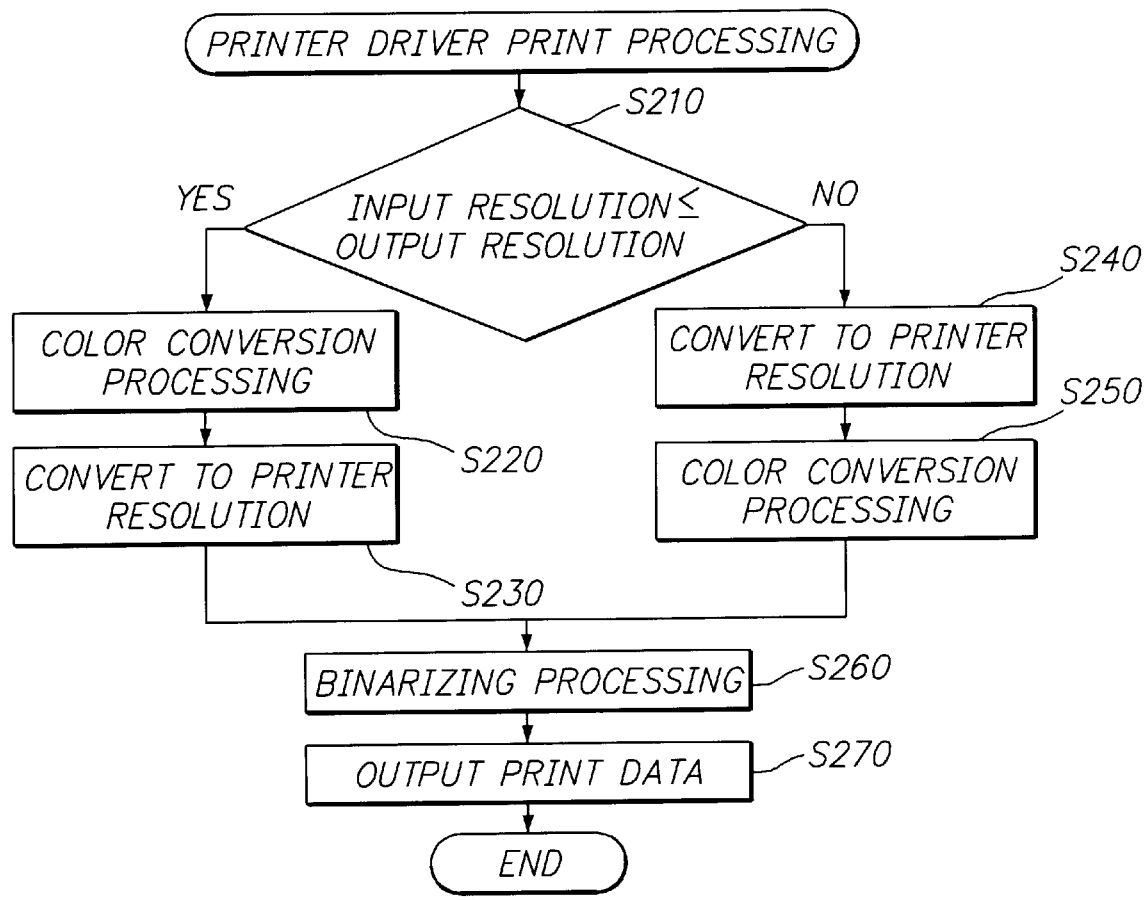
FIG. 8 is a flow chart showing a procedure of printing processings of a printer driver.

The flow chart of FIG. 8 shows the processing in which the printer driver 21b receives the print data from the operating system 21a and performs printing at step S150.

Now, referring to FIG. 2(a), the printer driver 21b is constituted by a rasterizer 21b1 where the application 21d cuts out a scanning range of the print heads 31a in the printer 31 from image data formed by a predetermined screen unit, a color conversion unit 21b2 for converting grey scale data of RGB into grey scale data of CMY in reference to a color conversion table with respect to each pixel of the dot matrix data, a grey scale converting unit 21b3 for converting the grey scale data of CMY into binary data and a resolution comparing unit 21b4 for inquiring a pixel size designated by the application 21d in accordance with a function in respect of the operating system 21a and comparing the pixel size with a pixel size of the printer 31. Incidentally, the printer driver 21b is constituted by software and respective constituent elements are also constituted by software. Further, these elements scan the print heads 31a in respect of the printer 31 in accordance with a procedure shown by FIG. 8 and outputs print data of printable dot matrix data.

That is, at step S210, the operation inquires a pixel size designated by the application 21d to the operating system 21a, compares it with a pixel size of the printer 31 and determines which resolution is larger. For example, a general resolution of the display 32 is a resolution of 72 dpi. There are cases where the application 21d handles data in accordance with the resolution of the display 32. There are cases where when the resolution of the scanner 11 is 300 dpi, data is handled internally in accordance with 300 dpi and a display is performed on the display 32 in a state in which the resolution is converted into 72 dpi. The application 21d outputs print data by designating a pixel size regardless of the resolution of the display 32 and accordingly, the printer driver 21b inquires the pixel size.

Figure 9:
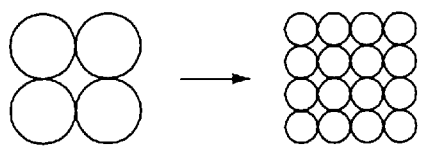
FIG. 9 is an explanatory view showing a state of converting a resolution into a higher one.

When the pixel size designated by the application 21d is known, the pixel size is compared with a pixel size of the printer 31. Although depending on designation of print mode, when the resolution of the printer 31 is 600 dpi, the resolution on the side of the application 21d, that is, the resolution of color image data constituting pre conversion data is lower. When the resolution of color image data constituting pre conversion data is lower than the resolution of color image data constituting post conversion data, in order to match the resolutions for printing, as shown by FIG. 9, an original 1 dot pixel is converted into 4 dots. Accordingly, when color conversion is performed before converting the resolution, one operation of color conversion is needed and when color conversion is carried out after converting the resolution, four operations of color conversion are needed.

Therefore, in order to reduce an amount of calculation, when the resolution of color image data constituting pre conversion data is lower than the resolution of color image data constituting post conversion data at step S210, the processing of color conversion is previously executed at step S220. That is, the determination per se at step S210 constitutes resolution comparing means and a branched processing in accordance with the result of determination constitutes conversion order controlling means.

Figure 10:
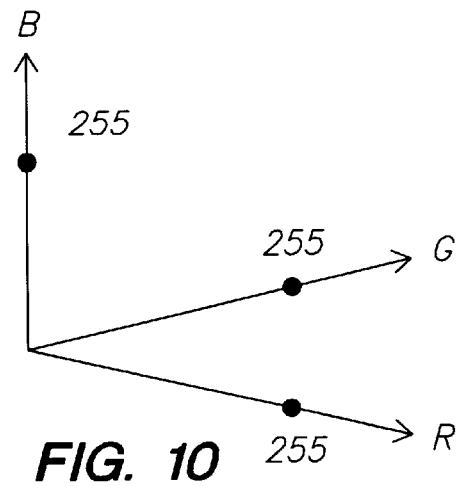
FIG. 10 is a view showing a color representing space of RGB.

FIG. 10 indicates three-dimensional color representing space having component values of RGB gray scale data formed by the application 21d as coordinates where grey scale data of CMY in correspondence with a color conversion table are recorded in correspondence with lattice points present at predetermined intervals. That is, the color conversion table is a three-dimensional table of (R, G, B) arranged to be able to read univocally respective data of CMY with grey scale data of RGB as component values. However, the file per se is provided with a four-dimensional file structure that is referred to by four of arrangement variables such that three data of (C, M, Y) can be taken out for one set of (R, G, B). Incidentally, such a color conversion table is recorded on the hard disc 22.

Figure 11:
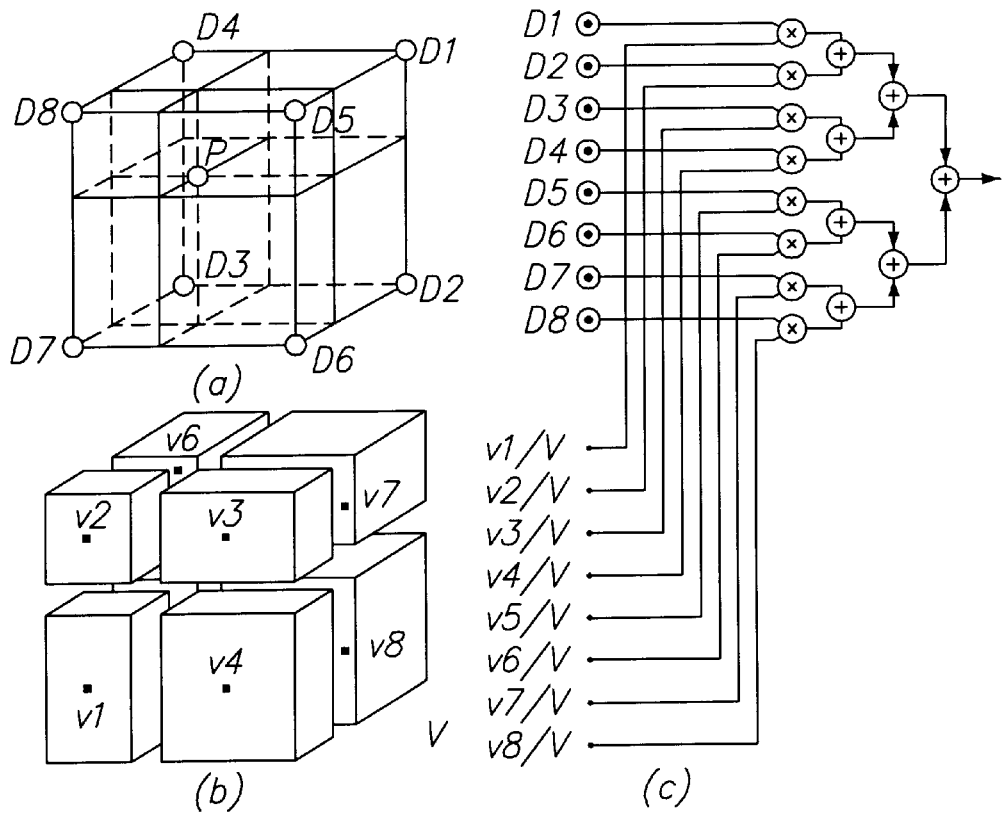
FIG. 11 is a view showing a concept of eight points interpolation calculation.

FIG. 11 shows the principle of calculation in respect of eight point interpolation calculation. When a cubic body comprising 8 points of lattice points surrounding coordinates P having RGB grey scale data as component values, is assumed in a pre conversion color representing space, when a converted value at a k-th apex of the cubic body is designated by notation Dk and the volume of the cubic body is designated by V, a converted value Px at an inner point P of the cubic body can be interpolated by the following equation by weighting in accordance with ratios of volumes Vk of illustrated eight small rectangular parallelepipeds divided by P point.

$$Px = \sum_{k=1}^{8} (Vk/V) \cdot Dk \qquad (1)$$

Accordingly, 8 of the lattice points surrounding the coordinates are specified and calculation is executed for each of grey scale data of CMY at each lattice point. Further, step S220 constitutes the color converting unit 21b2.

Figure 12:
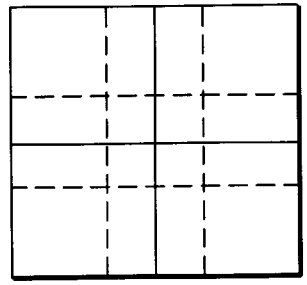
FIG. 12 is a view showing a method of converting resolution.

After performing the color conversion, at step S230, the resolution is converted into the resolution of the printer 31. The concept of the converting operation is shown by FIG. 12 where calculation is performed with respect to which pixel in an image range in correspondence with the pre conversion resolution (range designated by solid lines of figure) an image range in correspondence with the post conversion resolution (range designated by broken lines of figure) corresponds to. When one pixel after conversion is within one pixel of resolution before conversion, the same color is succeeded as it is and when one pixel after conversion ranges over two pixels of the resolutions before conversion, the respective color components are succeeded in proportion to area ratios of the ranged two pixels. The same is applicable in the case where one pixel after conversion ranges over four pixels of resolutions before conversion. Such a conversion processing of a resolution to the printer resolution is not naturally limited to this example and can be changed pertinently. Incidentally, step S230 constitutes resolution converting means.

Figure 13:
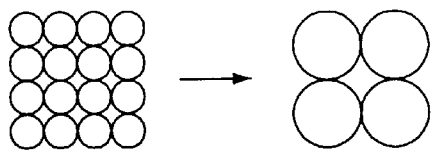
FIG. 13 is an explanatory view showing a state of converting a resolution to a lower one.

By contrast, assume a case where the pixel size designated by the application 21d is smaller than the pixel size of the printer 31. Although depending on designation of printing mode, the operation corresponds to the case where the resolution of the scanner 11 is 600 dpi and the application 21d handles data in accordance with the resolution and the resolution of the printer 31 is 300 dpi. When the resolution of the pre conversion color image data is higher than the resolution of the post conversion color image data in this way, if the resolutions are intended to match for printing, as shown by FIG. 13, original 4 dots of pixels are converted into 1 dot of pixel. Accordingly, when the color conversion is performed before converting the resolution, 4 times of color conversion is needed and when color conversion is performed after converting resolution, one time of color conversion is needed.

Accordingly, at step S240, the resolution is converted into the resolution of the printer before color conversion and color conversion is performed at a successive step S250.

Incidentally, although according to the example, data which the application 21d outputs via the operating system 21a, is a dot matrix data, it may be something like meta file. Meta file is a command file describing information of figure such as whether a figure is square or circular and in respect of the command file, the rasterizer 21b1 in the printer driver 21b carries out also a processing of forming a dot matrix data in accordance with the resolution of the print heads 31a. The side having a lower resolution may be regarded as a side having smaller information source to be converted by color conversion and accordingly, even with the side having a low resolution of a meta file, when color conversion is executed before converting the resolution of the printer, color conversion for each pixel is not needed. Further, according to the case of a meta file, colors are designated by a figure drawing command and accordingly, only color designating portions in the figure drawing command are changed.

When conversion to the printer resolution and color conversion have been finished by a predetermined procedure as described above, at step S260, a binarizing operation referred to as half tone is carried out in order to form data which the printer 31 can print at step S270. Although an explanation has not be given of a specific method of grey scale conversion represented by the binarizing operation, a well-known method such as error diffusion method, dithering utilization or the like may be applied which is, for example, explained also in Japanese Examined Patent Publication No. JP-B-7-30772 filed by the applicants. Thereafter, when the print data is outputted to a print buffer of the printer 31 at step S270, printing can be performed at a high speed since the color conversion has been performed by fewer calculation processings.

In this way, the resolution of color image data constituting pre conversion data is compared with resolution of color image data constituting post conversion data at step S210, as a result of comparison, when the resolution on the input side is lower, the color conversion is previously performed at step S220 and the resolution is converted at step S230. When the resolution on the input side is higher, the resolution is converted at step S240 and thereafter, color conversion is performed at step S250. Thus, the color conversion is carried out on the side where the resolution is low when both of the conversion of resolution and the color conversion are conducted whereby color conversion is performed with respect to fewer pixels and the processing can be optimized.

We claim:

1. An image processing device accompanied by conversion of resolution and color conversion, said device comprising:

resolution comparing means for comparing a resolution of color image data constituting pre conversion data with a resolution of color image data constituting post conversion data;

resolution converting means for converting the resolutions between the color image data constituting the pre conversion data and the color image data constituting the post conversion data;

color converting means for performing a color conversion between a color representing space of the color image data constituting the pre conversion data and a color representing space of the color image data constituting the post conversion data;

conversion order controlling means for executing the color conversion before or after converting the resolutions, on a side having a lower one of the resolutions, based on a comparison result of the resolution comparing means.

2. A color printing device for printing a color image in accordance with a predetermined record density, in which raster data in accordance with the record density is formed from color image data constituting pre conversion data and a color conversion is performed from a color representing space of the color image data constituting the pre conversion data to a color representing space of a colorant for printing with the record density:

wherein a resolution of the color image data constituting the pre conversion data is compared with a resolution at the record density and the color conversion is performed before or after converting the resolutions, on a side having a lower one of the resolutions.

3. A method of image processing accompanied by conversion of resolution and color conversion, said method comprising:

a step of comparing a resolution of color image data constituting pre conversion data with a resolution of color image data constituting post conversion data;

a step of converting the resolutions between the color image data constituting the pre conversion data and the color image data constituting the post conversion data;

a step of performing a color conversion between a color representing space of the color image data constituting the pre conversion data and a color representing space of the color image data constituting the post conversion data; and a step of controlling a conversion order such that the color conversion is executed before or after converting the resolutions, on a side having a lower one of the resolutions, based on a comparison result of the resolutions.

4. A medium recording an image processing program accompanied by conversion of resolution and color conversion, said medium is recorded with an image processing program comprising:

a step of comparing a resolution of color image data constituting pre conversion data with a resolution of color image data constituting post conversion data;

a step of converting the resolutions between the color image data constituting the pre conversion data and the color image data constituting the post conversion data;

a step of performing a color conversion between a color representing space of the color image data constituting the pre conversion data and a color representing space of the color image data constituting the post conversion data;

a step of controlling a conversion order such that the color conversion is executed before or after converting the resolutions, on a side having a lower one of the resolutions, based on a comparison result of the resolutions.

5. The image processing device according to claim 1, wherein the resolution comparing means operates automatically to output the comparison result.

6. The image processing device according to claim 1, wherein the resolution comparing means is operated by a manual switch to output the comparison result.

7. The image processing device according to claim 1, wherein the color conversion is performed using an interpolation calculation.

8. The image processing device according to claim 1, wherein the device is constituted by a computer including an application, printer driver and video driver, wherein the application sends a print request, the printer driver is initiated, the application and printer driver set a form, the application outputs print data in a format in accordance with the form and the printer driver accepts the print data and processes the print data to be output to an output device, wherein the printer driver includes the resolution comparing means, the resolution converting means, the color converting means and the conversion order controlling means.

9. The image processing device according to claim 8, wherein the computer includes an operating system, and the print data created by the application are input to the printer driver under control of the operating system.

10. The method according to claim 3, wherein the color conversion is performed using an interpolation calculation.

11. The method according to claim 3, wherein the method is carried out on a computer including an application, printer driver and video driver, wherein the method further comprises:

a step of the application sending a print request;

a step of initiating the printer driver;

a step of the application and printer driver setting a form;

a step of the application outputting print data in a format in accordance with the form;

a step of the printer driver accepting the print data and processing the print data to be output to an output device, wherein the processing comprises the step of comparing a resolution, the step of converting the resolutions, the step of performing a color conversion and the step of controlling a conversion order.

12. The medium according to claim 4, wherein the color conversion is performed using one of an interpolation calculation and a grey scale conversion.

13. The medium according to claim 4, wherein the image processing program further comprises:

a step of sending a print request;

a step of initiating a printer driver;

a step of the image processing program and printer driver setting a form;

a step of the image processing program outputting print data in a format in accordance with the form;

a step of the printer driver accepting the print data and processing the print data to be output to an output device, wherein the processing comprises the step of comparing a resolution, the step of converting the resolutions, the step of performing a color conversion and the step of controlling a conversion order.

14. The image processing device according to claim 8, wherein the the printer driver comprises:

a rasterizer unit; and a grey scale converting unit performing grey scale conversion for data with respect to which resolution conversion and color conversion have been performed, thereby obtaining print data.

* * * * *